(12) United States Patent
Blair et al.

(10) Patent No.: US 8,308,368 B2
(45) Date of Patent: Nov. 13, 2012

(54) TRACK ROLLER

(75) Inventors: David W. Blair, Market Harborough (GB); Dennis E. Bozych, Downers Grove, IL (US)

(73) Assignee: Rexnord Industries, LLC, Milwaukee, WI (US)

( * ) Notice: Subject to any disclaimer, the term of this patent is extended or adjusted under 35 U.S.C. 154(b) by 1032 days.

(21) Appl. No.: 12/171,443

(22) Filed: Jul. 11, 2008

(65) Prior Publication Data
US 2009/0016656 A1    Jan. 15, 2009

Related U.S. Application Data

(60) Provisional application No. 60/949,646, filed on Jul. 13, 2007.

(51) Int. Cl.
*F16C 27/00* (2006.01)
*F16C 33/14* (2006.01)

(52) U.S. Cl. ........ 384/418; 384/280; 384/286; 384/295; 29/898.1; 29/898.066; 474/94

(58) Field of Classification Search ............... 384/203, 384/275, 289, 286, 417, 584; 474/94, 178, 474/902; 305/137; 156/124, 117, 129, 245, 156/148, 172, 192; 29/898.058, 898.059, 29/898.066, 898.1
See application file for complete search history.

(56) References Cited

U.S. PATENT DOCUMENTS

| | | | |
|---|---|---|---|
| 1,576,924 A | | 3/1926 | Malloy |
| 2,090,179 A | * | 8/1937 | Brownyer ............ 295/11 |
| 3,147,048 A | * | 9/1964 | Johnson et al. ............ 384/584 |
| 3,257,860 A | * | 6/1966 | Runde et al. ............ 474/94 |
| 3,530,026 A | * | 9/1970 | Emmett et al. ............ 156/425 |
| 3,552,533 A | * | 1/1971 | Nitz et al. ............ 192/107 M |
| 3,776,792 A | * | 12/1973 | Graway ............ 156/124 |
| 4,040,883 A | * | 8/1977 | Matt et al. ............ 156/148 |
| 4,685,184 A | | 8/1987 | Satkamp |
| 4,998,783 A | * | 3/1991 | Erlenmaier et al. ............ 305/137 |
| 5,110,221 A | * | 5/1992 | Narkon et al. ............ 384/203 |
| 5,156,533 A | | 10/1992 | Hoffman et al. |

(Continued)

FOREIGN PATENT DOCUMENTS

EP    478774 A1 * 4/1992

(Continued)

OTHER PUBLICATIONS

Advertisement, Industrial Maintenance and Plant Operation, May 2007.

(Continued)

*Primary Examiner* — Marcus Charles
(74) *Attorney, Agent, or Firm* — Quarles & Brady LLP

(57) ABSTRACT

A self-lubricating track roller and a method of making the self-lubricating track roller are disclosed. First, an inner ring is provided having a radially outwardly facing surface. A parting agent is applied onto the radially outwardly facing surface. Next, a self-lubricating material is applied over the radially outwardly facing surface. Then, an outer ring is formed around the self-lubricating material such that a radially inwardly facing surface of the outer ring is bonded to the self-lubricating material. A resilient tire is bonded onto the radially outwardly facing surface of the outer ring. In the resulting track roller, the radially outwardly facing surface of the inner ring has a surface profile that corresponds to a mating surface profile of the self-lubricating material that is bonded to the radially inwardly facing surface of the outer ring.

17 Claims, 2 Drawing Sheets

U.S. PATENT DOCUMENTS

| | | | |
|---|---|---|---|
| 5,219,232 A * | 6/1993 | Adams et al. | 384/275 |
| 5,398,294 A | 3/1995 | Narkon | |
| 5,447,377 A | 9/1995 | Baumgartner et al. | |
| 5,465,485 A * | 11/1995 | Miyake et al. | 29/892.11 |
| 5,503,466 A * | 4/1996 | Lew | 301/5.307 |
| 5,537,746 A * | 7/1996 | Narkon | 29/898.066 |
| 5,540,626 A * | 7/1996 | Asai et al. | 474/94 |
| 5,560,103 A | 10/1996 | Harris et al. | |
| 5,762,424 A | 6/1998 | Harris et al. | |
| 5,843,264 A * | 12/1998 | Mabuchi et al. | 156/245 |
| 5,924,705 A * | 7/1999 | Kubelka | 280/11.231 |
| 5,988,015 A * | 11/1999 | Riu | 474/94 |
| 6,012,784 A * | 1/2000 | Oertley | 305/137 |
| 6,042,271 A | 3/2000 | Harris et al. | |
| 6,171,194 B1 * | 1/2001 | Haga et al. | 464/89 |
| 6,183,230 B1 * | 2/2001 | Beardmore et al. | 464/89 |
| 6,241,082 B1 | 6/2001 | Vanmeenen | |
| 6,398,420 B1 | 6/2002 | Tanaka et al. | |
| 6,439,282 B1 * | 8/2002 | Kimura et al. | 152/158 |
| 6,514,369 B1 * | 2/2003 | Shieh | 156/154 |
| 6,647,896 B1 * | 11/2003 | Nottingham et al. | 105/378 |
| 6,860,638 B2 | 3/2005 | Fish | |
| 6,948,433 B2 | 9/2005 | Hoffmann et al. | |
| 7,176,167 B2 | 2/2007 | Akiyama et al. | |
| 7,226,213 B2 | 6/2007 | Roos et al. | |
| 7,244,185 B2 * | 7/2007 | Kamdem et al. | 474/902 |
| 7,291,241 B2 * | 11/2007 | Dunlap | 156/245 |
| 2003/0035602 A1 | 2/2003 | Shobert et al. | |
| 2004/0109621 A1 | 6/2004 | Frost | |
| 2004/0213492 A1 | 10/2004 | Kim et al. | |
| 2006/0088235 A1 | 4/2006 | Ueda | |
| 2008/0087368 A1 * | 4/2008 | Nobuchika et al. | 156/117 |

FOREIGN PATENT DOCUMENTS

| | | | |
|---|---|---|---|
| FR | 2661865 A1 * | 11/1991 | |
| JP | 20001457760 A * | 5/2000 | |
| SU | 1655837 A1 * | 10/1991 | |
| SU | 2096235 C1 * | 11/1997 | |
| WO | WO 0153066 A1 * | 7/2001 | |

OTHER PUBLICATIONS

European Search Report dated Nov. 29, 2011.

* cited by examiner

TRACK ROLLER

CROSS-REFERENCE TO RELATED APPLICATIONS

This application claims the benefit of U.S. Provisional Patent Application Ser. No. 60/949,646, filed on Jul. 13, 2007, which is hereby incorporated in entirety.

STATEMENT REGARDING FEDERALLY SPONSORED RESEARCH OR DEVELOPMENT

Not Applicable.

BACKGROUND OF THE INVENTION

1. Field of the Invention

The present invention relates generally to a track roller. In particular, the present invention relates to a self-lubricating track roller with a resilient tire bonded to an outer ring.

2. Description of the Related Art

Conventional track rollers use internal rolling elements, such as needles, to allow the rotation of one of the roller rings relative to the other. To work effectively, the rolling elements are often coated with a lubricant supplied by an external source. However, in environments with extreme temperatures or chemical contamination, an external lubrication source is not always practical. In an attempt to address some of the deficiencies of external lubrication sources, self-lubricating track rollers have been developed.

For example, U.S. Pat. No. 5,398,294 discloses a track roller with a self-lubricating material bonded to the inner ring. The track roller is created by injecting the self-lubricating material between the inner ring and an outer ring and then curing the self-lubricating material. The inner ring may be swaged to form inclined axial bearing surfaces. During use, these surfaces will resist axial forces that could cause separation of the inner ring and the outer ring.

Yet another self-lubricating track roller is disclosed in U.S. Pat. No. 4,685,184. This track roller includes a self-lubricating liner material bonded via adhesive to a radially outwardly facing surface of an inner ring. A heat shrinkable tubing assembly fixture is used to securely adhere the self-lubricating liner material to the inner ring. The inner ring is then assembled with an outer ring to form a self-lubricating track roller.

To be effective, the components of self-lubricating track rollers must be precisely formed. Unless the self-lubricating track rollers maintain this precision, their service life will be shortened. Even minor defects from fabrication or use can result in irreparable damage to the roller, requiring it to be taken out of service.

For example, self-lubricating track rollers are particularly susceptible to binding as a result of contamination or abrasion at the sliding interface (i.e., the interface between the self-lubricating surface and the adjacent sliding surface). If the friction at the sliding interface exceeds the friction between the surfaces at other roller interfaces, then the surfaces at the other roller interfaces may slide past one another causing undesired wear damage. For example, such wear damage may occur at the interface between two components of the track roller or between the track roller and the object that the track roller is transporting (i.e., a conveyor belt or an object being directly transported on the track roller). In either case, the binding at the sliding interface results in damage to the track roller or another item in the motive assembly.

Additionally, track rollers are commonly subjected to vibrations and oscillations that may result in fretting or corrosion damage. These vibrations and oscillations can occur from the use of the track roller itself, the use of other machines in the vicinity of the track roller, or both. If the track roller is stationary when it is subjected to vibration, then the vibration can cause the selective degradation of a portion of the surface at the sliding interface. This selective degradation in turn may create asymmetries along the sliding interface that can interrupt the smooth rotation of the roller or provide a gap that permits contaminants to encroach on the sliding interface.

Although treatments exist that prevent corrosion and fretting damage to bearings, these treatments are typically only applicable to externally-lubricated rollers. For example, U.S. Pat. No. 7,176,167 discloses a vibration resistant bearing that uses rust preventative oil. The oil contains a high-pressure organic additive that protects the bearing from damage due to vibrations. U.S. Pat. Pub. No. 2006/0088235 discloses a bearing having fretting resistance. Specifically, the roller bearing components are subjected to carbonitriding to provide fretting resistance.

Hence, a need exists for a self-lubricated track roller that does not require an external lubrication source, but is less susceptible to damage by sliding contact, corrosion, and fretting.

BRIEF SUMMARY OF THE INVENTION

The present invention provides a self-lubricating track roller and method of making a self-lubricating track roller. The self-lubricating track roller of this invention provides a self-lubricating material with a surface profile that closely matches the surface profile of the adjacent sliding surface to reduce exposure of the sliding interface to contaminants.

The present invention provides a method of making a self-lubricating track roller. The method includes providing an inner ring having a radially outwardly facing surface. A parting agent is applied onto the radially outwardly facing surface of the inner ring. Then, a self-lubricating material is applied over the radially outwardly facing surface of the inner ring. Once the self-lubricating material is applied, an outer ring is formed around the self-lubricating material such that a radially inwardly facing surface of the outer ring bonds to the self-lubricating material. Finally, a resilient tire is bonded onto a radially outwardly facing surface of the outer ring.

According to one aspect of the invention, the step of forming an outer ring around the self-lubricating material such that the radially inwardly facing surface of the outer ring bonds to the self-lubricated material may include (1) wrapping resin soaked filaments around the self-lubricating material and the radially outwardly facing surface of the inner ring and (2) curing resin soaked filaments to form an outer ring having a radially outwardly facing surface.

According to another aspect of the invention, a radial groove may be formed on one of the radially outwardly facing surface of the inner ring and the radially inwardly facing surface of the outer ring. Further, a radial ridge may be formed on the other of the radially outwardly facing surface of the inner ring and the radially inwardly facing surface of the outer ring. The radial groove and the radial ridge may act to resist axial forces acting on the inner ring and the outer ring.

According to other aspects of the invention, the tire and its relationship to the outer ring may be further defined. A radial groove may be formed on one of the radially outwardly facing surface of the outer ring and a radially inwardly facing surface of the resilient tire. A corresponding radial ridge may be formed on the other of the radially outwardly facing surface of the outer ring and the radially inwardly facing surface of the resilient tire. The radial groove and radial ridge may resist axial forces acting on the outer ring and the resilient tire. Reinforcements may be embedded surrounding the outer ring and the tire. Grooves may be formed in a radially outwardly facing surface of the tire. In one form of the invention, the step of bonding the tire onto the radially outwardly facing surface of the outer ring may include molding the tire over the radially outwardly facing surface of the outer ring. Furthermore, the tire may be formed from an elastomeric material. Additionally, to rough the surface of the outer ring for improved bonding, the radially outerwardly facing surface of the outer ring may be machined prior to bonding the tire thereto.

According to another aspect of the invention, the surface of the inner ring to is treated to resist corrosion.

The self-lubricating track roller made by the method is also within the scope of the invention. In the self-lubricating track roller made by the method of the invention, there may be a radially outwardly facing surface of the inner ring has a surface profile that corresponds to a mating surface profile of the the self-lubricating material to prevent entry of contaminants into a sliding interface between the inner ring and the self-lubricating material.

The present invention also provides a self-lubricating track roller. The self-lubricating track roller includes an inner ring having a radially outwardly facing surface and an outer ring having a radially outwardly facing surface and a radially inwardly facing surface. A self-lubricating material is bonded to the radially inwardly facing surface of the outer ring such that the outer ring slidably surrounds the radially outwardly facing surface of the inner ring. A resilient tire is bonded to the outer surface of the outer ring. The radially outwardly facing surface of the inner ring has a surface profile that corresponds to a mating surface profile of the self-lubricating material that is bonded to the radially inwardly facing surface of the outer ring.

According to one aspect of the invention, the outer ring may include cured resin soaked filaments wrapped around a self-lubricating fabric.

According to another aspect of the invention, one of the radially outwardly facing surface of the inner ring and the radially inwardly facing surface of the outer ring may include a radial groove and the other of the radially outwardly facing surface of the inner ring and the radially inwardly facing surface of the outer ring may have a radial ridge extending into the groove to resist axial forces acting on the inner ring and the outer ring.

According to still another aspect of the invention, one of the radially outwardly facing surface of the outer ring and a radially inwardly facing surface of the resilient tire may include a radial groove and the other of the radially outwardly facing surface of the outer ring and the radially inwardly facing surface of the resilient tire may have a radial ridge extending into the groove to resist axial forces acting on the outer ring and the resilient tire.

According to other aspects of the invention, the tire may have other features. Reinforcements may be embedded in the tire and surround the outer ring. The tire may have grooves formed in a radially outwardly facing surface of the tire. Further, the tire may be formed from an elastomeric material.

According to yet another aspect of the invention, the inner ring may be metallic. Further, the inner ring may be surface treated to resist corrosion.

The present invention provides a track roller that is less likely to be damaged and does not require an external lubrication source. This objective is accomplished by including an inner ring and a resilient tire bonded to the radially outwardly facing surface of the outer ring. The inner ring is treated to resist vibration and oscillation damage. The objective is also accomplished by providing a self-lubricating surface, which eliminates the need for an external lubrication source. Additionally, the resilient tire provides higher friction between the radially outwardly facing surface of the track roller and the contact surface, which reduces the likeliness of sliding damage.

The present invention also provides an efficient manufacturing process for the assembly of the track roller. Generally, this includes applying a parting agent onto the radially outwardly facing surface of the inner ring, applying the self-lubricating material over the radially outwardly facing surface, wrapping a material around the self-lubricating material to form the outer ring, and bonding the resilient tire onto the radially outwardly facing surface of the outer ring.

These and other aspects of the invention are not intended to define the scope of the invention for which purpose claims are provided. In the following description, reference is made to the accompanying drawing, which forms a part hereof, and in which there is shown by way of illustration, and not limitation, the preferred embodiment of the invention. The embodiment does not define the scope of the invention and reference must be made therefore to the claims for this purpose.

BRIEF DESCRIPTION OF THE DRAWINGS

Reference is hereby made to the following figures in which.

DETAILED DESCRIPTION OF THE PREFERRED EMBODIMENT

Figure 1:
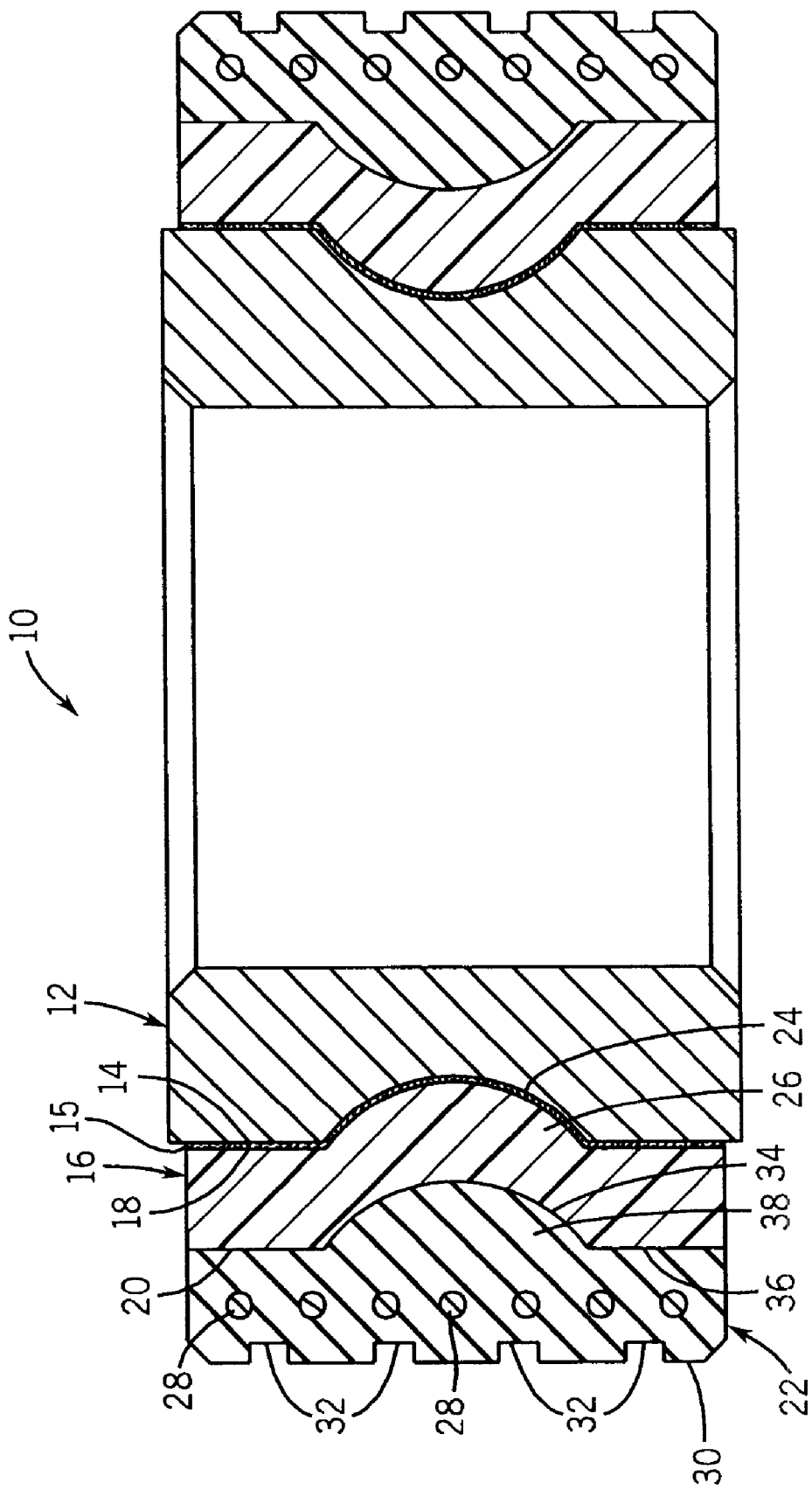
FIG. 1 is a cross-sectional view of a track roller incorporating the present invention.
Figure 2:
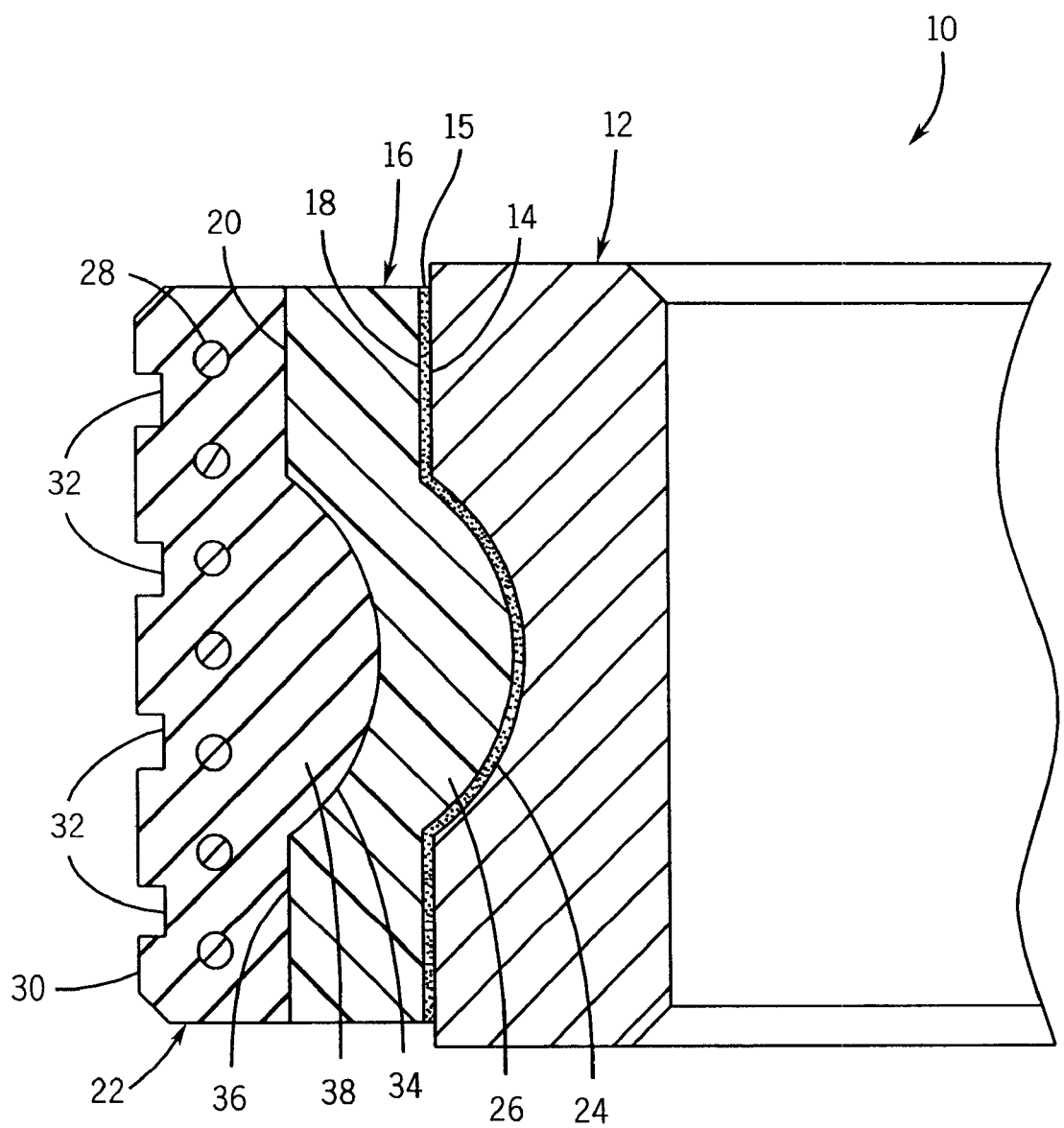
FIG. 2 is an enlarged cross-sectional view of the track roller of FIG. 1.

Referring to FIGS. 1 and 2, a self-lubricating track roller 10 is shown including an inner ring 12 and an outer ring 16 with a self-lubricating material 15 forming a portion of a sliding interface therebetween. A resilient tire 22 may be placed on or formed around a radially outwardly facing surface 20 of the outer ring 16 to contact a track (not shown), conveying surface, or object being transported.

The self-lubricating material 15 provides a sliding interface between the inner ring 12 and the outer ring 16 permitting the rotation of one relative to the other. In one form, the self-lubricating material 15 is bonded to the body of the outer ring 16 to form a radially inwardly facing surface 18. However, as the self-lubricating material 15 is not bonded to a radially outwardly facing surface 14 of the inner ring 12, the outer ring 16 slideably surrounds the radially outwardly facing surface 14 of the inner ring 12. Alternatively, the radially outwardly facing surface 14 of the inner ring 12 may be bonded to the self-lubricating material 15, such that the radially inwardly facing surface 18 of the outer ring 16 slidably surrounds the self-lubricating material 15 bonded to the inner ring 12.

The self-lubricating material 15 can be any one of a number of self-lubricating materials such as, for example, a polytetrafluoroethylene resin soaked fabric, Teflon®, and the like.

In the configuration in which the self-lubricating material 15 is bonded to the outer ring 16, the inner ring 12 may be metallic and have at least the radially outwardly facing surface 14 surface treated to resist corrosion and fretting damage. The surface treatment may include, but is not limited to, electroless nickel plating, hard chrome plating, or a salt nitriding process. Although a corrosion and fret resistant inner ring 12 is preferable, the inner ring 12 can be formed from any material, such as plastic, resin soaked filaments, and the like.

In this configuration, and for fabrication reasons that will be described in detail below, it may be preferable that the body of the outer ring 16 is formed from cured resin-soaked fiberglass filaments. However, the body could also be metallic, non-metallic, or a composite material without departing from the scope of the invention.

However, it is contemplated that in the alternative configuration, in which the self-lubricating material 15 is bonded to the inner ring 12 and forms a sliding interface with the outer ring 16, the materials of the inner ring 12 and the outer ring 16 may be reversed.

In some forms, a groove-ridge structure between the inner ring 12 and the outer ring 16 may be used to resist axial forces on the self-lubricating track roller 10. In one form, the radially outwardly facing surface 14 of the inner ring 12 includes a radial groove 24. The radially inwardly facing surface 18 of the outer ring 16 includes a radial ridge 26. The radial ridge 26 extends into the radial groove 24 to resist axial forces acting on the inner ring 12 and the outer ring 16. Alternatively, the radially outwardly facing surface 14 of the inner ring 12 may include a radial ridge which extends into a radial groove on the radially inwardly facing surface 18 of the outer ring 16. Although the self-lubricating material 15 is located between the inner ring 12 and the outer ring 16, the self-lubricating material 15 may follow the groove-ridge structure between the two rings.

The radial groove 24 is not limited to the semi-circular shape shown in FIG. 1. The shape of the radial groove 24 and the radial ridge 26 may be rectangular, elliptical, or the like. Additionally, a plurality of radial grooves 24 may be located between the inner ring 12 and the outer ring 16.

In operation, the frictional force at the sliding interface is preferably less than the frictional force at the other roller interfaces. As the outer ring 16 rotates relative to the inner ring 12, it is intended that the resilient tire 22 will rotate with the outer ring 16. Thus, it is preferable that the frictional force between the resilient tire 22 and the outer ring 16 exceeds the frictional force at the sliding interface between the inner ring 12 and the outer ring 16. In one form, the resilient tire 22 may be bonded to the radially outwardly facing surface 20 of the outer ring 16. Likewise, it is desirable that the frictional force between the resilient tire 22 and the track, conveying surface, or object being transported exceeds the frictional force at the sliding interface, such that the movement of the track, conveying surface, or object being transported causes the outer ring 16 to rotate relative to the inner ring 12 at the sliding interface rather than having the track, conveying surface, or object being transported slide past (and, thus, cause wear along) a radially outwardly facing surface 30 of the resilient tire 22.

In one preferred form, the resilient tire 22 is formed from an elastomeric material, such as rubber, plastic, and the like. However, the material for the resilient tire 22 may be varied to obtain appropriate properties of strength, hardness, ductility, coefficient of friction, and chemical compatibility for a particular application.

The resilient tire 22 may be fabricated to promote frictional contact with the track or item being transported. A plurality of grooves 32 may be formed in the radially outwardly facing surface 30 of the resilient tire 22. The plurality of grooves 32 assist in the removal of any fluids from the radially outwardly facing surface 30 that may reduce friction between the radially outwardly facing surface 30 and the contact surface. In the form shown, the grooves 32 have rectangular cross sections. Alternatively, the cross-sectional shape of the grooves 32 may be triangular, rectangular, elliptical, like that of a tread on an automobile tire, or the like.

To provide additional strength to the resilient tire 22, a plurality of reinforcements 28 can be embedded in the resilient tire 22. In some forms, the reinforcements 28 are circular strands of material surrounding the outer ring 16. The material from which the reinforcements 28 are formed may include, but is not limited to, fiberglass, nylon, polyester, and steel. The structure of the reinforcements 28 may also include, but is not limited to, a randomly organized fiber matrix and a woven mesh surrounding the outer ring 16.

To resist axial forces, in some forms, a groove-ridge structure may be provided at the interface between the outer ring 16 and the resilient tire 22. In one form, the radially outwardly facing surface 20 of the outer ring 16 includes a radial groove 34. A radially inwardly facing surface 36 of the resilient tire 22 includes a radial ridge 38 which extends into the radial groove 34 to resist axial forces acting on the outer ring 16 and the tire 22, as well as to increase the bonding area between the outer ring 16 and the tire 22. Alternatively, the radially outwardly facing surface 20 of the outer ring 16 may include a radial ridge which extends into a radial groove on the radially inwardly facing surface 36 of the tire 22.

The radial groove 34 is not limited to the semi-circular shape shown in FIG. 1. Alternatively, the shape of the radial groove 34 and the radial ridge 38 may be rectangular, elliptical, or the like. Additionally, a plurality of radial grooves 34 can be located between the outer ring 16 and the tire 22.

The self-lubricating track roller 10 can be manufactured using a process comprising the following steps.

First, the inner ring 12 having radially outwardly facing surface 14 is provided. The radially outwardly facing surface 14 may have radial groove 24 to accommodate radial ridge 26. Alternatively, the radially outwardly facing surface 14 may have a radial ridge.

Next, a parting agent is applied onto the radially outwardly facing surface 14 of the inner ring 12. The parting agent may be a silicone material or another material suitable for use as a parting agent. Once the parting agent has been applied, the self-lubricating material 15 is applied over the parting agent and heat shrunk onto the radially outwardly facing surface 14 of inner ring 12.

Resin soaked fiberglass filaments are then wrapped around the self-lubricating material 15. The resin soaked fiberglass filaments urge the self-lubricating material 15 into the radial groove 24. The resin soaked filaments are cured and bonded to the self-lubricating material 15. In this way, the outer ring 16 having the self-lubricating radially inwardly facing surface 18 and the radially outwardly facing surface 20 is formed.

Finally, the resilient tire 22 is bonded onto the radially outwardly facing surface 20 of the outer ring 16. The resilient tire 22 may be bonded to the radially outwardly facing surface 20 of the outer ring 16 in a number of ways. These include, but are not limited to, bonding the resilient tire 22 to the surface 20 by using an adhesive or molding the tire 22 over the surface 20. Moreover, the outwardly facing surface 20 of the outer ring 16 can be machined or "roughed" prior to bonding the tire 22 thereto to improve the bond therebetween.

The plurality of grooves 32 formed in the radially outwardly facing surface 30 of the resilient tire 22 may also be formed in a number of ways. These include, but are not limited to, cutting grooves 32 in the resilient tire 22 after the tire is bonded to the radially outwardly facing surface 20 of the outer ring 16, or including the groove shape in the mold base if the tire 22 is molded to the surface 20 as described above.

Although the formation of an outer ring around and inner ring has been described above, it should be appreciated that an inner ring might be formed inside of the outer ring, with the self-lubricating surface therebetween. For example, an inwardly facing surface of the outer ring may be provided. A parting agent may be applied to this inwardly facing surface and a self-lubricating material placed thereupon by heat shrinking or other forms of layer deposition. Then, the inner ring may be formed by molding or other such processes such that the self-lubricating material bonds to the outwardly facing surface of the inner ring.

The track roller described herein may be used in any situation in which sliding motion of the contact surface is to be prevented. This includes using a plurality of track rollers to form a track roller platform for the transport of objects, using a plurality of track rollers to support a moving platform and move along a track, and the like.

The invention has been described in connection with what is presently considered to be the preferred embodiment. However, the present invention has been presented by way of illustration and is not intended to be limited to the disclosed embodiment. Accordingly, those skilled in the art will realize that the invention is intended to encompass all modifications and alternative arrangements included within the spirit and scope of the invention, as set forth by the claims.

We claim:

1. A method of making a self-lubricating track roller, the method comprising:
   providing an inner ring having a radially outwardly facing surface;
   applying a parting agent onto the radially outwardly facing surface of the inner ring;
   applying a self-lubricating material over the radially outwardly facing surface of the inner ring;
   forming an outer ring around the self-lubricating material by wrapping resin soaked filaments around the self-lubricating material and the radially outwardly facing surface of the inner ring and curing the resin soaked filaments to form an outer ring having a radially outwardly facing surface and so that a radially inwardly facing surface of the outer ring bonds to the self-lubricating material, wherein one of the radially inwardly facing surface of the outer ring and the radially outwardly facing surface of the inner ring includes a radial groove formed between axially extending cylindrical surfaces of one of the outer ring and the inner ring, and the other of the radially inwardly facing surface of the outer ring and the radially outwardly facing surface of the inner ring have a radial ridge formed between axially extending cylindrical surfaces of the other of the outer ring and the inner ring, said radial ridge extending radially into the radial groove to resist axial forces acting on the outer ring and the inner ring, said radial groove and radial ridge being formed between the axially extending cylindrical surfaces of the inner and outer rings to resist radial forces acting on the outer ring and inner ring; and
   bonding a resilient tire onto a radially outwardly facing surface of the outer ring.

2. The method as in claim 1, further comprising forming a radial groove on one of the radially outwardly facing surface of the inner ring and the radially inwardly facing surface of the outer ring and forming a radial ridge on the other of the radially outwardly facing surface of the inner ring and the radially inwardly facing surface of the outer ring to resist axial forces acting on the inner ring and the outer ring.

3. The method as in claim 1, further comprising forming a radial groove on one of the radially outwardly facing surface of the outer ring and a radially inwardly facing surface of the resilient tire and forming a corresponding radial ridge on the other of the radially outwardly facing surface of the outer ring and the radially inwardly facing surface of the resilient tire to resist axial forces acting on the outer ring and the resilient tire.

4. The method as in claim 1, further comprising embedding reinforcements surrounding the outer ring in the tire.

5. The method as in claim 1, further comprising forming grooves in a radially outwardly facing surface of the tire.

6. The method as in claim 1, wherein bonding the tire onto the radially outwardly facing surface of the outer ring includes molding the tire over the radially outwardly facing surface of the outer ring.

7. The method as in claim 1, wherein the tire is formed from an elastomeric material.

8. The method as in claim 1, further comprising treating the surface of the inner ring to resist corrosion.

9. The method as in claim 1, further comprising machining the radially outwardly facing surface of the outer ring prior to bonding the tire thereto.

10. A self-lubricating track roller made by providing an inner ring having a radially outwardly facing surface, applying a parting agent onto the radially outwardly facing surface of the inner ring, applying a self-lubricating material over the radially outwardly facing surface of the inner ring, forming an outer ring around the self-lubricating material by wrapping resin soaked filaments around the self-lubricating material and curing the resin soaked filaments such that a radially inwardly facing surface of the outer ring bonds to the self-lubricating material, and bonding a resilient tire onto a radially outwardly facing surface of the outer ring, the self-lubricating track roller comprising a surface profile on the radially outward facing surface of the inner ring that corresponds to a mating surface profile of the self-lubricating material to prevent entry of contaminants into a sliding interface between the inner ring and the self-lubricating material, wherein said mating surface profile is defined by one of the radially inwardly facing surface of the outer ring and the radially outwardly facing surface of the inner ring including a radial groove formed between axially extending cylindrical surfaces of one of the outer ring and the inner ring, and the other of the radially inwardly facing surface of the outer ring and the radially outwardly facing surface of the inner ring having a radial ridge formed between axially extending cylindrical surfaces of the other of the outer ring and the inner ring, said radial ridge extending radially into the radial groove to resist axial forces acting on the outer ring and the inner ring, said radial groove and radial ridge being formed between the axially extending cylindrical surfaces of the inner and outer rings to resist radial forces acting on the outer ring and inner ring.

11. A self-lubricating track roller comprising:
   an inner ring having a radially outwardly facing surface;
   an outer ring having a radially outwardly facing surface and a radially inwardly facing surface;
   a self-lubricating material bonded to the radially inwardly facing surface of the outer ring such that the outer ring slidably surrounds the radially outwardly facing surface of the inner ring;
   a resilient tire bonded to the outer surface of the outer ring; and
   wherein the outer ring includes cured resin soaked filaments wrapped around the self-lubricating material and wherein the radially outwardly facing surface of the inner ring has a surface profile that corresponds to a mating surface profile of the self-lubricating material at a sliding interface, said mating surface profile being defined by one of the radially inwardly facing surface of the outer ring and the radially outwardly facing surface of the inner ring including a radial groove formed between axially extending cylindrical surfaces of one of the outer ring and the inner ring, and the other of the radially inwardly facing surface of the outer ring and the radially outwardly facing surface of the inner ring having a radial ridge formed between axially extending cylindrical surfaces of the other of the outer ring and the inner ring, said radial ridge extending radially into the radial groove to resist axial forces acting on the outer ring and the inner ring, said radial groove and radial ridge being formed between the axially extending cylindrical surfaces of the inner and outer rings to resist radial forces acting on the outer ring and inner ring.

12. The self-lubricating track roller as in claim 11, in which one of the radially outwardly facing surface of the outer ring and a radially inwardly facing surface of the resilient tire includes a radial groove and the other of the radially outwardly facing surface of the outer ring and the radially inwardly facing surface of the resilient tire have a radial ridge extending into the groove to resist axial forces acting on the outer ring and the resilient tire.

13. The self-lubricating track roller as in claim 11, including reinforcements embedded in the tire and surrounding the outer ring.

14. The self-lubricating track roller as in claim 11, in which the tire has a radially outwardly facing surface and grooves are formed in the radially outwardly facing surface of the tire.

15. The self-lubricating track roller as in claim 11, in which the inner ring is metallic.

16. The self-lubricating track roller as in claim 11, in which the tire is formed from an elastomeric material.

17. The self-lubricating track roller as in claim 11, in which the inner ring is surface treated to resist corrosion.

* * * * *